Patented May 26, 1942

2,284,566

UNITED STATES PATENT OFFICE 2,284,566

PRODUCTS CAPABLE OF PREVENTING THE COAGULATION OF BLOOD AND A METHOD OF MAKING THE SAME

Horst Elsner, Berlin, Germany, assignor to Schering Corporation, Bloomfield, N. J., a corporation of New Jersey No Drawing. Application August 22, 1938, Serial No. 226,140. In Germany August 23, 1937

9 Claims. (Cl. 167—65)

This invention relates to products capable of preventing the coagulation of blood, and more particularly to such products derived from algae, and a method of making the same.

Hitherto, in order to prevent the coagulation of blood heparin (Howell) produced from the liver or lungs or hirudin (Haykraft) produced from leeches have usually been employed. It is also known that the sodium salt of the galactane sulphuric acid produced from the red alga *Iridaea laminaroides* counteracts coagulation (Elsner et al., Zeit. fur Physiol. Chemie, vol. 246, pp. 244–247, 1937; Hassid, J. Am. Chem. Soc., vol. 55, pp. 4163–7, 1933).

I have now found that physiologically highly active products preventing coagulation of blood are extracted by means of aqueous solvents from certain red algae, especially from *Delesseria sanguinea* (L.) Lam. The product prepared from the latter group of algae is distinguished over the known extracts from other species of algae and over synthetic preparations (carbohydrate sulfuric esters) not only by its physical properties and chemical composition, but also by its considerably higher physiologic activity. The extracts are preferably produced by treating the drug three to six days with water with an addition of disinfecting agents as, for instance, toluene or a p-hydroxybenzoic acid ester, at 20–25° C. as at this temperature the mucinous substances do not dissolve. However, the extraction may also be carried out with hot water. The aqueous extract is then evaporated in a vacuum and further purified preferably by redissolving and subsequent precipitating or by dialysis. A white product is obtained having the appearance of regenerated cellulose, that is transparent in thin layers and is soluble in physiological salt solution.

The crude product prepared from the alga Delesseria that can be further purified by dialysis, retards coagulation of the human blood at 40° C. in a dilution of 1:400,000 for at least 15 seconds. It is practically non-poisonous. By intravenous injection of 10 mg./kg. to a rabbit it is found that the blood withdrawn one hour after the injection is still liquid after 30 minutes at room temperature whereas the blood of rabbits usually coagulates 6 minutes after withdrawal.

As already indicated, the products of the present invention differ considerably in their properties from known materials which have been suggested as anti-coagulants. Thus solutions of an extract of the alga *Delesseria sanguinea* L. are quite thin and mobile while solutions of the same concentration of extracts of alga *Iridaea laminarioides* (see Hassid, supra), and of alga *Laminaria digitata*, which contains 1-fucosan sulfuric acid sodium, potassium and calcium salts (Lunde, Zeitschr. physiol. Chemie, vol. 247, 189, 1937) are very thick and viscous. The entire chemical composition of the extracts obtained according to the invention is not yet known, but it is known that it contains pentoses or methyl pentoses, which substances are not present in the known algae extracts. Aside from the fact that my new extracts are practically non-toxic, they are much more effective anti-coagulants than known materials, as will be seen from the following table, which is based on a value of 1 for heparin-Kahlbaum:

Alga material from *Delesseria sanguinea*, crude _____ 4
Alga material from Carrageen, crude_____ 1
Alga material from *Iridaea laminar*, pure_____ 1
Alga material from *Laminaria digitata*, pure___ 1

Chondroitin poly-sulfuric acid_____ ⅕–2
Cellulose tri-sulfuric acid (toxic!)_____ 1
Snythetic glycogen tri-sulfuric acid (toxic!) _____ ⅓–1/12
Yeast nucleic acid-sulfuric acid_____ 1/12

Also, the product of the invention has an ash content of about 31.5–32.5%, in contrast to the 25.4% content of the material extracted from *Iridaea laminarioides*.

Example 1

The dried alga Delesseria, preferably species gathered in May or July, is kept together with 40 parts of water and 1 part of toluene at a temperature of 20–25° C. under occasional shaking. After filtration the filtrate is evaporated to dryness at 40–45° C. whereupon the residue is dissolved in a little water; to this solution there is added drop by drop the double volume of 95% alcohol. The precipitate obtained forms after drying a white, voluminous, nearly tasteless powder, whereof 0.6–1.0 mg. are capable of keeping 3 ccs. of human blood permanently liquid at room temperature without excluding the air.

Example 2

The dried alga Delesseria is boiled with 40 parts of water for 30 minutes under reflux. After filtration and evaporation in a vacuum the further treatment is conducted as described in Example 1. By this procedure, however, products are obtained with lower activity than those obtained by an extraction of the alga at room temperature.

Extracts from the red alga *Delesseria sanguinea* are more stable than extracts from any other red alga; thus, from this drug the best products are obtained. Of course, many changes and variations may be made in the reaction conditions, the aqueous solvents used, the temperature employed and the like in accordance with the principles set forth herein and in the claims annexed hereto.

What I claim is:

1. A water-soluble, alcohol-insoluble, relatively non-toxic blood anti-coagulant extracted from the red algae *Delesseria sanguinea*, 1 mg. of which is capable of keeping 3 ccs. of human blood liquid over a protracted period at room temperature.

2. A water-soluble, alcohol-insoluble, relatively non-toxic blood anti-coagulant extracted from the red algae *Delesseria sanguinea* and relatively free from mucinous material and dissolvable in physiological saline solution, 1 mg. of which is capable of keeping 3 ccs. of human blood liquid over a protracted period at room temperature.

3. A solution capable of being given hypodermically and containing a water-soluble, alcohol-insoluble, relatively non-toxic blood anti-coagulant extracted from the red algae *Delesseria sanguinea*, said anti-coagulant in the amount of 1 mg. being capable of keeping 3 ccs. of human blood liquid over a protracted period at room temperature.

4. A method for the preparation of products capable of preventing coagulation of blood, comprising extracting the red alga *Delesseria sanguinea* L. with water, and isolating the active material from the aqueous extract so obtained.

5. A method for the preparation of products capable of preventing coagulation of blood, comprising extracting the red alga *Delesseria sanguinea* L. with water at approximately room temperature, isolating the active material from the aqueous extract so obtained, and purifying the same.

6. A method for the preparation of products capable of preventing coagulation of blood, comprising extracting the red alga *Delesseria sanguinea* L. with water, isolating the active material from the aqueous extract so obtained, and purifying the same by redissolving in water and reprecipitating.

7. A method for the preparation of products capable of preventing coagulation of blood, comprising extracting the red alga *Delesseria sanguinea* L. with water at approximately room temperature, and isolating the active material from the aqueous extract so obtained by precipitation by means of a water-soluble organic solvent.

8. A method for the preparation of products capable of preventing coagulation of blood, comprising extracting the red alga *Delesseria sanguinea* L. with water, isolating the active material from the aqueous extract so obtained, and purifying the same by dialysis.

9. A method according to claim 5, including the addition of a disinfectant during the extraction step.

HORST ELSNER.